United States Patent
Hancock et al.

(10) Patent No.: US 7,743,405 B2
(45) Date of Patent: Jun. 22, 2010

(54) METHOD OF AUTHENTICATION VIA A SECURE WIRELESS COMMUNICATION SYSTEM

(75) Inventors: Robert Hancock, Southampton (GB); Eleanor Hepworth, Southampton (GB); Stephen McCann, Southampton (GB)

(73) Assignee: Siemens Aktiengesellschaft, Munich (DE)

( * ) Notice: Subject to any disclaimer, the term of this patent is extended or adjusted under 35 U.S.C. 154(b) by 1105 days.

(21) Appl. No.: 10/972,780

(22) Filed: Oct. 26, 2004

(65) Prior Publication Data

US 2005/0163319 A1 Jul. 28, 2005

(30) Foreign Application Priority Data

Nov. 7, 2003 (GB) ................. 0325980.1
Mar. 12, 2004 (GB) ................. 0405489.6

(51) Int. Cl.
G06F 7/04 (2006.01)
H04K 1/00 (2006.01)

(52) U.S. Cl. .............. 726/2; 726/3; 726/4; 726/17; 380/247; 380/270

(58) Field of Classification Search .............. 726/2, 726/3, 4, 17; 380/247, 270
See application file for complete search history.

(56) References Cited

U.S. PATENT DOCUMENTS

| | | | |
|---|---|---|---|
| 5,887,251 A * | 3/1999 | Fehnel | 455/411 |
| 6,269,395 B1 * | 7/2001 | Blatherwick et al. | 709/219 |
| 6,396,805 B2 * | 5/2002 | Romrell | 370/216 |
| 6,493,751 B1 * | 12/2002 | Tate et al. | 709/221 |
| 6,587,882 B1 * | 7/2003 | Inoue et al. | 709/227 |
| 6,904,466 B1 * | 6/2005 | Ishiyama et al. | 709/245 |
| 6,990,525 B1 * | 1/2006 | Ying et al. | 709/227 |
| 7,483,984 B1 * | 1/2009 | Jonker et al. | 709/226 |
| 2001/0020241 A1 * | 9/2001 | Kawamoto et al. | 707/202 |
| 2001/0043595 A1 * | 11/2001 | Aravamudan et al. | 370/356 |
| 2004/0078219 A1 * | 4/2004 | Kaylor et al. | 705/2 |
| 2004/0107360 A1 * | 6/2004 | Herrmann et al. | 713/201 |
| 2004/0181692 A1 * | 9/2004 | Wild et al. | 713/201 |
| 2005/0047351 A1 * | 3/2005 | Orsic | 370/254 |
| 2007/0277230 A1 * | 11/2007 | Hawkins et al. | 726/4 |

FOREIGN PATENT DOCUMENTS

EP 1 345 386 A2 9/2003
WO WO 2004/064306 A2 7/2004

* cited by examiner

Primary Examiner—William R Korzuch
Assistant Examiner—Sarah Su
(74) Attorney, Agent, or Firm—Crowell & Moring LLP

(57) ABSTRACT

A method of authentication via a secure wireless communication system; the method comprising sensing that a mobile device has come within range of a secure network; initiating a program within the mobile device offering the user a plurality of authentication options; processing the chosen authentication option and providing requested user data to a service provider for the secure network, only if the chosen authentication option within the mobile device permits provision of the requested user data.

11 Claims, 1 Drawing Sheet

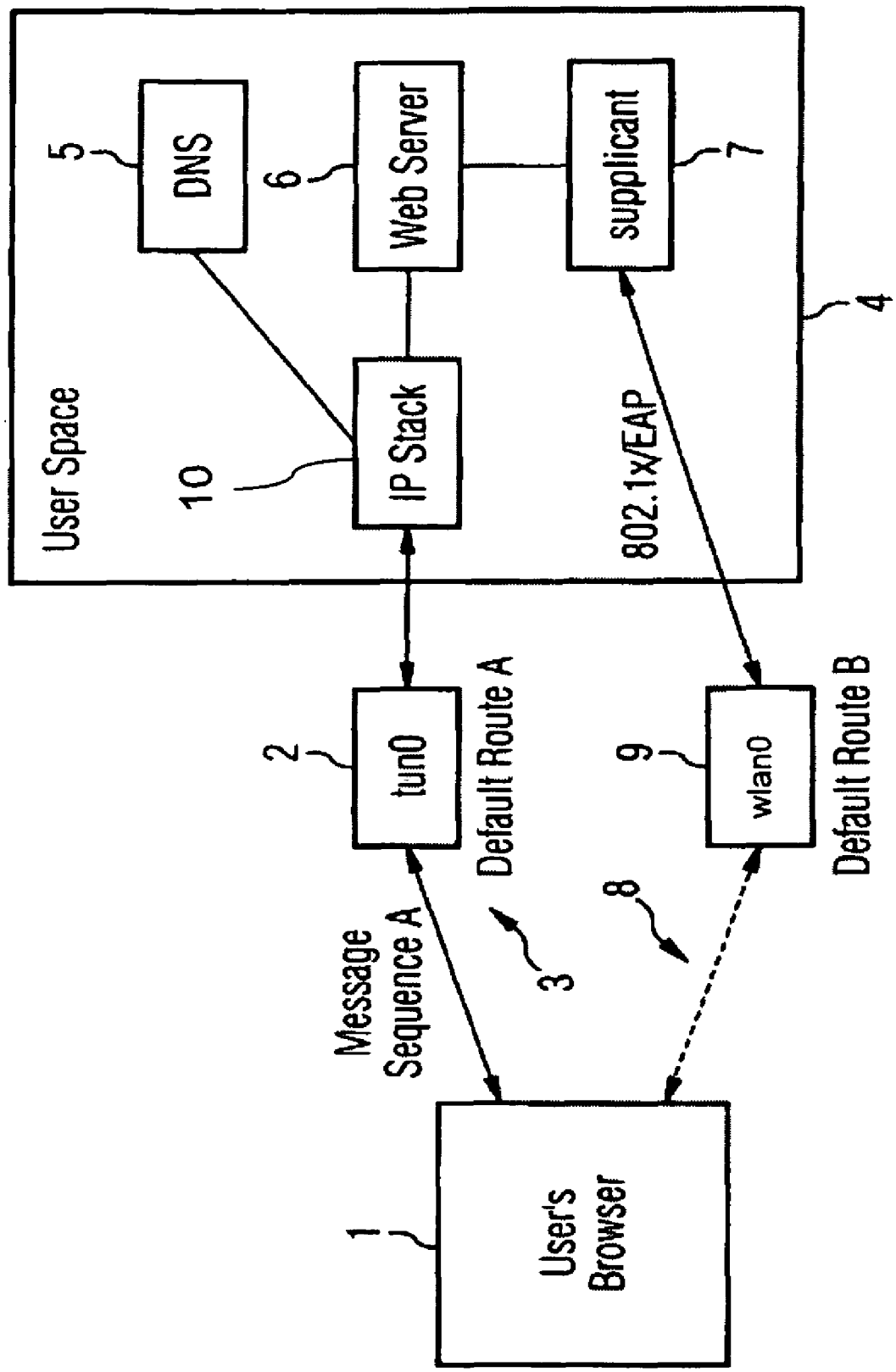

METHOD OF AUTHENTICATION VIA A SECURE WIRELESS COMMUNICATION SYSTEM

BACKGROUND AND SUMMARY OF THE INVENTION

This invention relates to a method of authentication via a secure wireless communication system.

In wireless local area network (WLAN) and cellular standards, there are two ways of authenticating a user terminal for use on a network. These are commonly known as open and closed security types. Conventional WLAN hotspot authentication, commonly using a user name and password, allows users to access the hotspot infrastructure before authentication occurs, i.e. the access points (APs) do not implement any access control measures on user data entering the network. This is the 'open security' model. Typically, in the open system a user device detects the presence of a network in an area by its radio signal and then automatically connects to the system by opening up a web browser or otherwise starting an application and all further actions are at application level. The WLAN hotspot authentication utilises a web browser portal page on which the user typically types in their username and password, but this is inherently insecure since it is possible for someone to tap into the radio signal, without the service provider being aware of this. This web browsing transaction, initially has very little security, leaving both the user's equipment and that of the hotspot vulnerable to external attack.

This model is slowly being rejected in favour of a 'closed security' model where APs themselves implement access control, restricting user access to the network infrastructure until a successful authentication exchange has been carried out. This alternative 'closed' system operates in the radio layer and requires the mobile device to provide security information before opening an application, such as a web browser. This authentication is arranged to occur automatically, as soon as the mobile device comes into range of the network using a security framework protocol standardised by IEEE 802.11i. A problem of this 'closed' solution is that the user may not wish to share this security information via a network which is not known to him, such as at a foreign airport, or where he might incur costs when he does not need to use his mobile device.

As more and more of the closed-type secure systems appear, there is a requirement for the user to be able to prevent his authentication credentials being exchanged automatically. Under the current arrangement, if the mobile device is switched on, then the wireless card detects a network on entry to the area of operation and automatically tries to log in.

In accordance with the present invention, a method of authentication via a secure wireless communication system comprises sensing that a mobile device has come within range of a secure network; initiating a program within the mobile device offering the user a plurality of authentication options; processing the chosen authentication option and providing requested user data to a service provider for the secure network, only if the chosen authentication option within the mobile device permits provision of the requested user data.

The invention ensures that the user's data is transferred via a secure route, but prevents automatic connection before the user has given permission and allows the user to control the time of data exchanged.

The user data may be any soft data, such as a user ID and PIN number, but preferably, the user data comprises a user name and password.

This maintains the 'open security' look and feel without the risk of open systems.

Optionally, the method further comprises exchanging authentication credentials via link layer specific protocols.

Specific protocols such as EAP can be used to exchange authentication credentials, such as SIM card data or credit card number, in accordance with the closed security aspects of the network, but if the user is concerned about releasing such data, then authentication can take place with only the soft data are exchanged.

The mobile device may be any electronic communication device, but preferably, the mobile device is one of a laptop, personal digital assistant or mobile phone.

The method is suitable for various types of networks, but preferably, the network is a wireless local area network.

Preferably, the offer of authentication options to the user is carried out by a local proxy on the user's mobile device.

Preferably, the local proxy encapsulates or decapsulates user data.

BRIEF DESCRIPTION OF THE DRAWING FIGURE

A method of authentication via a secure wireless communication system according to the present invention will now be described with reference to the accompanying drawing in which:

FIG. 1 illustrates one possible implementation of the method of the invention.

DETAILED DESCRIPTION

The present invention addresses the need to provide a 'closed security' solution, whilst retaining the look and feel of conventional web browser authentication, typically using a user name and password, by providing secure authentication in a mobile terminal using a local proxy. In technical terms, the move to a 'closed security' model is not straightforward, so not all networks will be immediately upgraded. The complete solution as defined by IEEE 802.11i (WLAN technology security project number) is hard to implement and compels hotspot providers to change their infrastructure. It also results in the user no longer being involved interactively. Although the 'closed security' model addresses the security shortcomings of the open model, it provides a totally different user experience because it does not involve a web based portal page, so there may be some user resistance to the closed system.

The present invention allows the user to intervene in the process before an exchange of credentials takes place and keep the general feel of the old open system the same for the user. This is done by causing a program, a DNS server stub, on the mobile device to start which appears to the user to be a web browser, but in fact is only on the mobile device. The user is informed that they are in a closed security model area and asked if they wish to proceed. Various options are given for the authentication method, which is effectively a request to the user for permission to connect. The network to which they are connecting will have certain basic requirements for authentication, but these are defined by the service provider, rather than the hotspot. Using a local web-browser gives an option which is the equivalent of 'do not connect'. If the user does want to connect, then further authentication can be carried out in the usual way for a closed system, for example by means of a transfer of the user's SIM card data or other secure ID, such as a credit card number, after the local proxy has confirmed that the user will permit this. The mobile device could be provided with a credit card reader, into which the credit card is inserted to provide the connection credentials, without having to type in number.

FIG. 1 illustrates functional blocks in a mobile terminal for one possible implementation of the present invention. The terminal needs to exchange user name and password credentials with a network using a common authentication exchange protocol. This could be, for example, Extensible Authentication Protocol Message Digest no. 5 (EAP-MD5) or EAP Lightweight Directory Access Protocol. (EAP-LDAP).

The sequence of events in the terminal to achieve this is as follows. When an association is required between a WLAN terminal and the network, a browser 1 is initiated by the user. The browser 1 sends a domain name server (DNS) request via a 'tun0' interface 2, tun0 being a default address used in UNIX based terminals, and this route is set as default route A, 3. In a user space 4, a DNS server stub 5 replies with a local address. The browser 1 then does a HyperText Transfer Protocol (HTTP) 'GET' request to this local address and a user space web server stub 6 replies with a simple HyperText Markup Language (HTML) page.

The HTML page is displayed on the browser 1 and requests that the user enter their user name and password. The browser then performs a POST operation on the page which is passed back through default route A 3 to a user space supplicant 7 which extracts the user name and password from the POSTed data. The user name and password are then passed into a suitable message type (e.g. MD5) and the supplicant 7 initiates a corresponding protocol (e.g. EAP-MD5) exchange with the network, via 'wlan0' 9 on a raw Ethernet socket. If this message exchange is successful, the supplicant 7 switches to default route B 8 via 'wlan0' 9 and on its next 'refresh' redirects the web-browser 1 to a uniform resource locator (URL), which conventionally would have opened automatically without the procedure described above.

The web browser then communicates directly through the 'wlan0' interface, default route B 8, and continues using a kernel Internet Protocol (IP) stack 10 in the user space 4 in a conventional manner.

As described above, the present invention uses a local proxy in the user terminal, which appears to the user as a normal web service, but which actually provides a 'closed security' authentication solution, since it does not allow the user to connect to a network until authentication credentials have been exchanged, but also prevents automatic connection where the user has no control over which networks he connects to. The 'open security' model user credentials of username and password are passed across a 'closed security' system, whilst still retaining the 'open security' look and feel to the user. This local proxy is not a true web server, although it appears like one to the user. By manipulating lower layer data within the proxy, still within the terminal, a secure authentication method is provided.

The invention claimed is:

1. A method of authentication via a secure wireless communication system, the method comprising:
sensing that a mobile device has come within range of a secure network;
initiating a program within the mobile device offering a user a plurality of authentication options, wherein the offering of authentication options includes
obtaining a local address from a domain name server (DNS) on the mobile device, and
obtaining, from a first server on the mobile device, a page offering the plurality of authentication options;
processing a chosen authentication option and providing requested user data to a service provider for the secure network, only when the chosen authentication option within the mobile device permits provision of the requested user data.

2. The method according to claim 1, wherein the user data comprises user name and password.

3. The method according to claim 1, the method further comprising exchanging authentication credentials via link layer specific protocols.

4. The method according to claim 1, wherein the mobile device is one of a laptop, personal digital assistant or mobile phone.

5. The method according to claim 1, wherein the network is a wireless local area network.

6. The method according to claim 1, wherein the offering the user the plurality of authentication options comprises:
displaying a browser on the mobile device;
sending, by the browser, a domain name server (DNS) request to the DNS server on the mobile device,
wherein the local address is obtained by the browser from the DNS server, the page is obtained by the browser, the first server is associated with the local address, and the page is a HyperText Markup Language (HTML) page offering the plurality of authentication options.

7. A method of authentication via a secure wireless communication system, the method comprising:
sensing that a mobile device has come within range of a secure network;
initiating a program within the mobile device offering a user a plurality of authentication options, wherein the offering of authentication options includes
obtaining a local address from a domain name server (DNS) on the mobile device, and
obtaining, from a local proxy server on the mobile device, a page offering the plurality of authentication options;
processing a chosen authentication option and providing requested user data to a service provider for the secure network, only when the chosen authentication option within the mobile device permits provision of the requested user data.

8. The method according to claim 7, wherein the local proxy encapsulates or decapsulates the user data.

9. A method of authentication via a secure wireless communication network, comprising:
displaying a browser on a mobile device;
obtaining a local address from a domain name server (DNS) on the mobile device;
obtaining, by the browser from a first server of on the mobile device, a HyperText Markup Language (HTML) page offering a plurality of authentication options;
displaying the HTML page; and
processing a chosen authentication option and providing requested user data to a service provider for the secure network, only when the chosen authentication option within the mobile device permits provision of the requested user data.

10. The method according to claim 9, further comprising:
sending, by the browser, a domain name server (DNS) request to the DNS server on the mobile device.

11. The method of claim 9, wherein the displayed HTML page informs a user of the mobile device that the user is in a closed security model area and requests the user's authorization to proceed.

* * * * *